United States Patent [19]

Wisnia

[11] 4,276,536
[45] Jun. 30, 1981

[54] SELF-HEATING THERMISTOR PROBE FOR LOW TEMPERATURE APPLICATIONS

[75] Inventor: Jeffry A. Wisnia, Burlington, Mass.

[73] Assignee: Scully Electronic Systems, Inc., Wilmington, Mass.

[21] Appl. No.: 72,452

[22] Filed: Sep. 4, 1979

[51] Int. Cl.³ .................. H01C 7/13; H01C 7/02; H01C 7/04
[52] U.S. Cl. .................................... 338/23; 338/25; 338/28
[58] Field of Search ............... 338/22, 23, 24, 25, 338/28, 229; 340/622; 73/295, 362 AR; 29/612, 613

[56] References Cited

U.S. PATENT DOCUMENTS

| 2,685,015 | 7/1954 | Weiller | 338/28 |
| 3,005,171 | 10/1961 | Beckman | 338/28 |
| 3,025,706 | 3/1962 | Oppenheim | 73/362 AR |
| 3,299,296 | 1/1967 | Bullene | 338/22 R X |
| 3,340,527 | 9/1967 | Rowell | 340/622 X |
| 3,363,466 | 1/1968 | Guidi | 340/622 X |
| 3,365,618 | 1/1968 | Obenhaus | 338/22 R |
| 3,461,446 | 8/1969 | Sergeant | 340/622 X |
| 3,500,058 | 3/1970 | Hirsbrunner | 338/25 X |
| 3,559,883 | 2/1971 | Buiting et al. | 73/362 AR |

Primary Examiner—C. L. Albritton
Attorney, Agent, or Firm—Thompson, Birch, Gauthier & Samuels

[57] ABSTRACT

A liquid level sensing probe includes a glass or ceramic thermally conductive housing which is molded around a positive temperature coefficient thermistor and a negative temperature coefficient thermistor. The two thermistors are connected in parallel. The thermistor network thus formed is connected to a suitable measurement apparatus by leads which extend outside of the housing. The probe and the measurement apparatus detect and distinguish between a liquid environment as opposed to a gaseous one even at low temperatures and even after the power source has been shut off and subsequently switched on again.

9 Claims, 4 Drawing Figures

SELF-HEATING THERMISTOR PROBE FOR LOW TEMPERATURE APPLICATIONS

BACKGROUND OF THE INVENTION

I. Field of the Invention

This invention generally pertains to the art of liquid level sensing devices, and more particularly to low temperature applications (such as storage tanks for fuels and the like) wherein conventional liquid level sensing devices must be continually connected to operating power sources in order to operate properly.

II. Description of the Prior Art

U.S. Pat. Nos. 3,340,527 (Rowell) and 3,461,446 (Sargeant) disclose the use of negative temperatures coefficient thermistors (hereinafter called NTC thermistors) in liquid level sensing device. However, these devices cannot successfully operate after they have remained in very cold environments with the power disconnected. This invention is designed to permit liquid level sensing under these conditions, and is therefore distinguishable over the prior art.

III. Summary of the Invention

A conventional liquid level sensing system has a power source, a standard resistance, and an NTC thermistor all connected in series, with a voltmeter connected across the resistance. Typically, the power source is on the order of 12 V DC. Since an NTC thermistor has a resistance that decreases with its own temperature, the current through the resistance (and thus the voltage across it) increases with increasing temperature.

In conventional practice, the NTC thermistor is encapsulated and placed in a liquid containing tank, and the power source is turned on. As current flows through the NTC thermistor, it heats up and its resistance decreases until a steady state condition is reached, in which both the temperature of the NTC thermistor and the current flowing through it remain constant. When the encapsulated thermistor (hereinafter called the probe) is located in that portion of the tank which does not contain liquid, heat dissipation from the probe is minimized, and the probe temperature stabilizes at a high value. However, when the liquid in the tank reaches the level of the probe and partially or totally immerses it, heat dissipation is maximized and the probe temperature stabilized at a lower value.

It can thus be seen by one skilled in the art that by reading the voltmeter, the level of the liquid relative to the probe in question can be determined, since a stable high voltage reading will indicate that the liquid in the tank has not reached the level of the probe, and a stable low voltage reading will indicate that the probe has been at least partially immersed by the liquid in the tank. By using a vertically aligned, equally spaced-apart arrangement of probes, the level of the liquid in the tank can be determined to an accuracy equal to the distance between any two adjacent probes.

Although all this is known in the art, it will appear to one skilled therein that in order for the NTC thermistor to be used in this fashion, it must be heated to such a range (which range is herinafter referred to as its operating temperature range) that a steady state condition can be established at a non-zero current flow value through the thermistor. If the NTC thermistor is too cold, its resistance will be so high (approximately $\frac{1}{2}$ megohm) that, at conventional source voltages, it will act like an open circuit, and will never heat up enough to be usable in the fashion above described. Thus, if a conventional probe is used in a cold environment, e.g. $-40°$ F., it must be continuously connected to an operating power source. Otherwise, it will cool down too much and will not be usable.

In this invention, a heater is provided which works on the same power supply as is used with the NTC thermistor. As will appear hereinafter, this heater is used to raise the temperature of the NTC thermistor to a point at which the NTC thermistor will begin to draw sufficient power to heat itself up and eventually reach its operating temperature range. Moreover, this heater is so designed as not to interfere with the measuring function of the NTC thermistor after it has reached its operating temperature range.

DETAILED DESCRIPTION OF PREFERRED EMBODIMENTS

Figure 1:
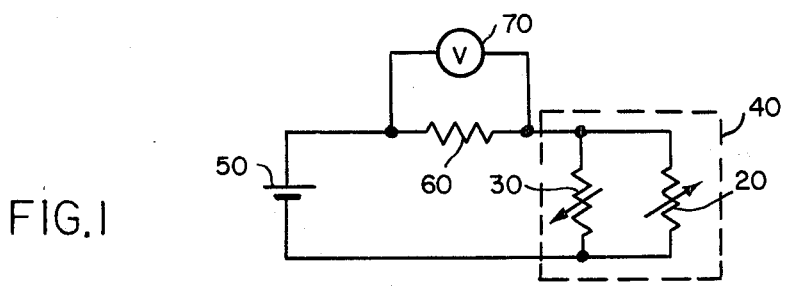
FIG. 1 is a schematic diagram of a conventional liquid level sensing system in which this invention is an element.
Figure 2:
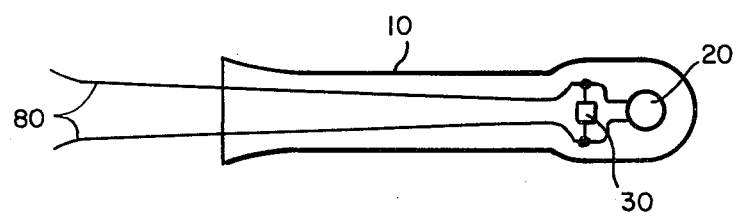
FIG. 2 is a side cutaway view of the mechanical construction of the invention.

A ceramic or glass housing 10 is molded around an NTC thermistor 20 and a PTC thermistor 30. The two thermistors are connected in parallel to form the network 40 shown within the dashed lines in FIG. 1. Two leads 80, each of which is connected to a corresponding side of the network, extend out of the housing. The encapsulated thermistors will be hereinafter referred to as a probe.

In a conventional measuring circuit, this network is placed in series with a 12 V DC power source 50 and a standard resistance 60, which is on the order of 100 ohms. Voltmeter 70, which is placed across the resistance, will have a reading proportional to the current through the resistance, which is equal to the current passing through the probe.

Initially, the probe is placed in a cold environment ($-40°$ F.) with the power supply turned off. In this state, PTC thermistor 30 has a low resistance on the order of 100 ohms, as is shown on FIG. 4, while NTC thermistor 20 has a resistance which is, for practical purposes here, infinite. Hence, PTC thermistor 30 begins to draw current when supply 50 is turned on. As current flows through PTC thermistor 30, the PTC thermistor heats up, because of the current flowing through it. Since both thermistors are in thermal communication with each other via the housing, the temperature of NTC thermistor 20 increases.

Figure 3:
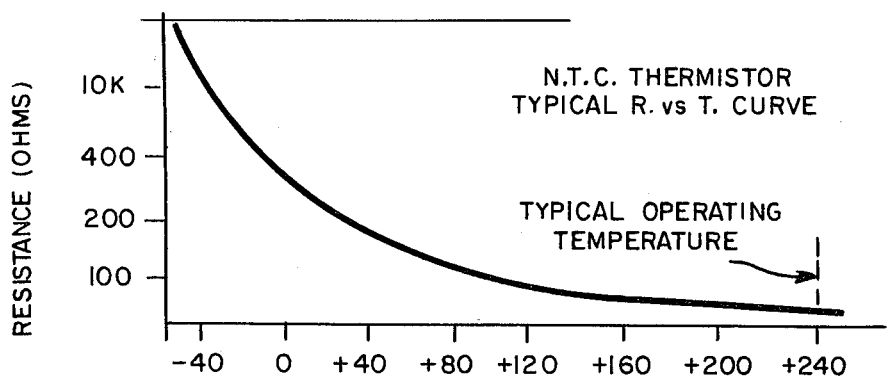
FIG. 3 is a graph showing the operating characteristics of a typical NTC thermistor.
Figure 4:
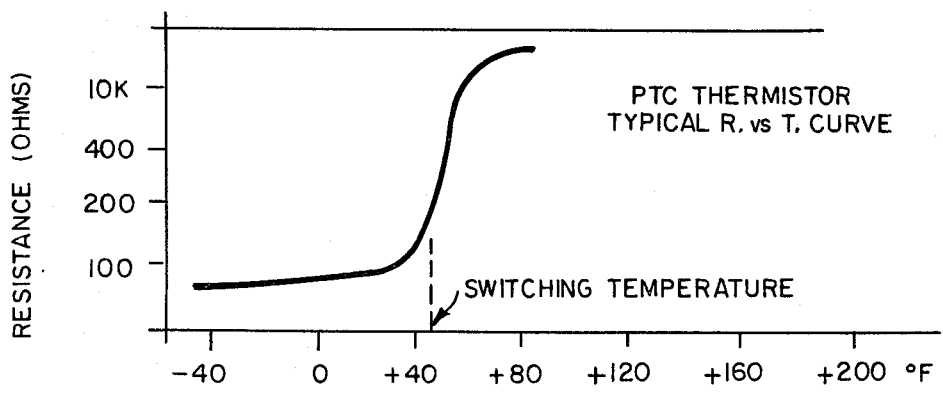
FIG. 4 is a graph showing the operating characteristics of a typical positive temperature coefficient thermistor (hereinafter called a PTC thermistor).

FIG. 4 shows that between $-40°$ F. and $40°$ F. PTC thermistor 30 has an essentially constant and low resistance which keeps its power draw high and allows the device to heat up rapidly. As it does so, NTC thermistor 20 exhibits decreasing resistance, as is shown in FIG. 3, and begins to draw current on its own as the temperature of the probe increases. By the time the probe has heated up to about $40°$ F., total power draw is at a maximum.

At this point, PTC thermistor 30 reaches its "switching temperature" which temperature is located at the center of the region of steep slope shown in FIG. 4. While NTC thermistor 20 continues to draw power and heat up, the current draw through PTC thermistor 30 decreases radidly until, at approximately 80° F., its resistance is, for practical purposes, infinite. Above this temperature, essentially all the power passing through the probe will pass through NTC thermistor 20, which heats up until it reaches its operating temperature range in the region of approximately 240° F.

When the probe has been heated to this extent, it can be seen that the effective resistance of the probe as seen by the power supply will be determined solely by the resistance of the NTC thermistor 20, since PTC thermistor 30 appears as an open circuit. Since the resistance of NTC thermistor 20 is solely a function of its temperature, the temperature of the probe completely determines its effective resistance.

Thus, when the probe is located in a gas environment, as in the space above the level of liquid in a partially filled tank, heat dissipation from the probe is minimized and the temperature of the probe is at a maximum, resulting in a minimum resistance and a high voltmeter reading. When, however, the probe is totally or partially immersed in liquid, heat dissipation is maximized and the temperature of the probe is minimized, resulting in a maximum resistance and a low voltmeter reading. Hence, as long as the probe is maintained at a temperature of at least 80° F., a high voltmeter reading will correspond to a non-immersed probe condition and a low voltmeter reading will correspond to an immersed probe condition.

It can thus be seen that this device can be used even after the power source is switched off, since the warm-up process described above can be employed after the probe has cooled off.

It is important to note that the switching temperature of the PTC thermistor 30 must be below the operating temperature range of NTC thermistor 20. This is because it is important that PTC thermistor 30 appears as an open circuit when the probe is actually being used to measure liquid levels. The critical operating characteristics of the PTC thermistor vis-a-vis the NTC thermistor is that the resistance of the NTC thermistor at the switching temperature of the PTC thermistor must be sufficiently small so that the NTC thermistor does not appear to be an open circuit at approximately 12 V DC.

The application of this probe to the liquid level measurement field as is set forth herein is intended to be descriptive, but not limiting. The probe may be used to measure temperature also. It is intended that the scope of this invention should be limited only by the following claims:

I claim:

1. A thermistor probe for use in low temperature applications comprising:
    (a) a thermally conductive housing;
    (b) a first thermistor having a negative temperature coefficient located in said housing, said first thermistor having two output terminals and two electrically conductive leads each attached to a corresponding output terminal, said leads extending out of said housing; and
    (c) a second thermistor having a positive temperature coefficient located in said housing and connected in parallel with said first thermistor, said first thermistor thermally and electrically responsive to said second thermistor, the electrical effect of said second thermistor being negligible when said first thermistor is at an operating temperature.

2. The probe of claim 1 wherein said second thermistor defines a heater and said first thermistor and said heater are connected together in a single electrical network.

3. The probe of claim 2 wherein the network is of a two output terminal type, each of the two output terminals being a corresponding electrically conductive lead.

4. The probe of claim 3 wherein the operating characteristics of said heater are such that said heater will heat said first thermistor, the resistance of said first thermistor decreasing as the temperature of said second thermistor increases to heat said first thermistor.

5. The probe of claim 4 wherein said heater has operating characteristics such that the electrical effect of the heater as measured at the output terminals of the network is negligible with respect to the effect of said first thermistor as measured at the output terminals of the network when the probe has been heated to the operating temperature range of said first thermistor.

6. The probe of claim 1 wherein said second thermistor has an operating characteristic such that its switching temperature is lower than the operating temperature range of said first thermistor.

7. The probe of claim 1 wherein said housing is glass.

8. The probe of claim 1 wherein said housing is ceramic.

9. The probe of claim 6 wherein said housing is molded around said first thermistor and said second thermistor.

* * * * *